3,527,742
Patented Sept. 8, 1970

3,527,742
FLUORINATED ALCOHOLS, THEIR ESTERS, AND USE THEREOF
Allen G. Pittman, El Cerrito, and William L. Wasley, Berkeley, Calif., assignors to the United States of America as represented by the Secretary of Agriculture
No Drawing. Original application Aug. 4, 1965, Ser. No. 477,331, now Patent No. 3,424,785, dated Jan. 28, 1969. Divided and this application Nov. 22, 1967, Ser. No. 703,199
Int. Cl. C08f 3/62
U.S. Cl. 260—89.5    9 Claims

ABSTRACT OF THE DISCLOSURE

Polymers derived from fluorine-containing acrylates or methacrylates, typically those of the structure $$\begin{array}{c} CF_3 \\ | \\ F-C-O-(CH_2)_{m+1}-O-\overset{O}{\overset{\|}{C}}-\overset{R''}{\overset{|}{C}}=CH_2 \\ | \\ CF_3 \end{array}$$

wherein $m$ is 1 to 20, and $R''$ is H or $CH_3$. The polymers are useful for application to fibrous materials to enhance their oil- and water-repellency.

---

This is a division of our application Ser. No. 477,331, filed Aug. 1965, now Pat. 3,424,785.

A nonexclusive, irrevocable, royalty-free license in the invention herein described, throughout the world for all purposes of the United States Government, with the power to grant sub-licenses for such purposes, is hereby granted to the Government of the United States of America.

This invention relates to and has among its objects the provision of novel processes for preparing fluorinated compounds, the provision of the compounds as new compositions of matter; and procedures for treating fibrous materials, especially textiles, with the compounds. Further objects of the invention will be evident from the following description wherein parts and percentages are by weight unless otherwise specified.

The novel fluorinated alcohols of the invention can be represented by the formula $$R_f-O-(CH_2)_{m+1}-OH$$

wherein:

$m$ is an integer from 1 to 20; $R_1$ is a fluorinated monovalent aliphatic (open or closed chain) radical containing solely carbon and at least one element of the class consisting of hydrogen and halogen, which contains and is joined to the oxygen bridge (—O—) by a segment of the structure $$\begin{array}{c} -C^\beta \\ \phantom{-}\diagdown \\ \phantom{--}FC^\alpha-\text{(to oxygen bridge)} \\ \phantom{-}\diagup \\ -C^\beta \end{array}$$

wherein the valences on the $\beta$ carbon atoms are satisfied by at least 2 fluorine atoms.

The invention also includes, as novel compounds, the esters of the aforesaid alcohols with acrylic acid or methacrylic acid, and the polymers of these esters. These esters may be represented by the structure $$R_f-O-(CH_2)_{m+1}-O-\overset{O}{\overset{\|}{C}}-\overset{R''}{\overset{|}{C}}=CH_2$$

wherein $R_f$ and $m$ are as defined above; $R''$ is H or $CH_3$. The invention further concerns the polymers of the said acrylic (and methacrylic) esters. These polymers have a skeletal chain containing recurring units of the structure $$\begin{array}{c} R'' \\ | \\ -C-CH_2- \\ | \\ C=O \\ | \\ O \\ | \\ (CH_2)_{m+1} \\ | \\ O \\ | \\ R_f \end{array}$$

wherein $R_f$, $m$, and $R''$ are as above defined.

A particularly critical aspect of the compounds of the invention is the presence of the above-described segment in $R_f$. The unique structure of this segment provides the advantage that it confers a greater degree of oleophobicity for a given number of fluorinated carbon groups than than with a straight-chain arrangement of $-CF_2-$ groups. In fact, our investigations have indicated that 3 fluorinated carbon atoms in our segmental arrangement provide a degree of oleophobicity equivalent to 6 or 7 fluorinated carbon atoms in a straight chain. Another important aspect of the invention is that the $$-O(CH_2)_{m+1}-$$

portion of the compounds provides effective isolation of the fluorinated radical ($R_f$) from the group at the opposite end. As a result, the products are stable and amenable to conversion to other derivatives. Thus, the alcohol group may be esterified; the acrylic (or methacrylic) esters may be polymerized, etc.

The alcohols of the invention are synthesized from fluorinated ketones in the following manner:

In a preliminary step (disclosed and claimed in our copending application, Ser. No. 398,129, filed Sept. 21, 1964) now Pat. 3,384,628, the fluoroketone is reacted with an alkali metal fluoride to convert the carbonyl radical of the ketone into an alkali metal fluorocarbinolate radical, that is, a fluorocarbinol group wherein the hydrogen of the hydrozyl radical is replaced by alkali metal. Thus, $$\overset{|}{C}=O \xrightarrow{MF} F\overset{|}{C}-OM$$

In the above formulas, M stands for an alkali metal.

In the next step (described and claimed in our copending application, Ser. No. 466,865, filed June 24, 1965, now Pat. 3,409,647), the fluorocarbinolate intermediate is reacted with an ester of an omega-haloaliphatic acid to to form an ester, as follows:

$$F\overset{|}{C}-OM + X-(CH_2)_m-COOR' \longrightarrow$$

$$F\overset{|}{C}-O(CH_2)_m-COOR' + MX$$

In the above formulas, M is an alkali metal.

X is a halogen; $m$ is an integer from 1 to 20; and $R'$ is a monovalent hydrocarbyl radical, e.g., alkyl, cycloalkyl, alkenyl, alkaryl, or aryl.

In the following step, the aforesaid ester is reduced to produce an alcohol of the structure $$F\overset{|}{C}^*-O-(CH_2)_{m+1}-OH$$

wherein $m$ is as defined above.

It is evident from the above formulas that the synthesis converts the carbonyl group (of the ketone) to an ether linkage without requiring the use of a reducing agent and concomitantly, a fluorine group is added, that is, the product contains a fluorine group on the alpha carbon atom derived from the ketone. (This carbon atom is indicated above by the asterisk.) This is an unusual and heretofore unknown type of structure which gives the products especially useful properties. In particular, it imparts a degree of oleophobicity an dhydrophobicity far greater than can be attained with related compounds wherein the same position is occupied by hydrogen.

The process of the invention is by no means limited to the example above but is of great versatility and, generically, can be applied to any aliphatic (open-chain or closed-chain) ketone which contains at least two fluorine groups adjacent to the carbonyl group. In other words, the carbon atoms connected to the carbonyl group must contain at least two fluorine atoms—distributed on these carbon atoms symmetrically or asymmetrically. These fluorine groups are a critical item to activate the carbonyl group so that it will undergo the desired transformation when contacted with the alkali metal fluoride. Especially good results are obtained when the carbon atoms adjacent to the carbonyl radical contain halogen radicals (i.e., F, Cl, Br, or I) in addition to the minimum of two fluorine groups. In this connection it may be noted that although halogens of higher atomic weight than fluorine—i.e., Cl, Br, and I—are not effective by themselves to activate the carbonyl group, they can be employed to supplement the activating influence of fluorine groups. Beyond the positions adjacent to the carbonyl group, the structure of the ketone is of no criticality to the process and available sites may be occupied, for example, by hydrogen or halogen. In other words, the critical item for the process aspect of this invention is that the starting compound contain a carbonyl group activated by adjacent fluorine atoms as explained hereinabove; the remainder of the starting compound is not material to the process. Of course, this remainder may be limited in accordance with certain parameters to provide particular, desired characteristics in the products. However, such limitation concerns the character of the products—the alcohols, esters, or polymers thereof—not the operation of the process.

The alcohols of the invention admirably serve as intermediates from which to prepare useful esters. Accordingly, another phase of the invention concerns the preparation of such esters. Although any desired esters can be produced from the alcohols, the esters with which we are concerned and which are valuable products are the acrylic or methacrylic acid esters. These esters are prepared by reacting the alcohols with an acryloyl (or methacryloyl) halide, typically the chloride, bromide, or iodide.

Typical examples of ketones to which the process of the invention may be applied and the corresponding alcohol and ester products are given in the tables below, by way of illustration but not limitation:

Ketone starting compound
$$\begin{cases} m \text{ is } 1 \text{ to } 20 \\ Z \text{ is } H, -\overset{O}{\overset{\|}{C}}-CH=CH_2, \text{ or} \\ -\overset{O}{\overset{\|}{C}}-\overset{CH_3}{\underset{|}{C}}=CH_2 \end{cases}$$

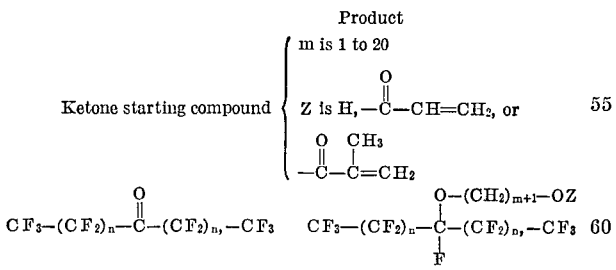

Wherein $n$ and $n'$ are each a number from 0 to 10

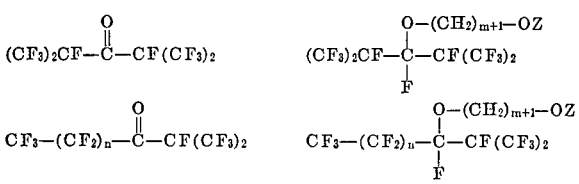

Wherein $n$ is a number from 0 to 18

Wherein R represents the heptafluorocyclobutyl radical

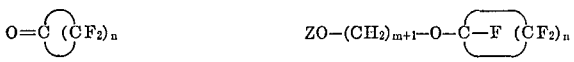

Wherein $n$ is a number from 3 to 10

Compounds containing other halogen atoms in addition to fluorine (Y is Cl, Br, or I)

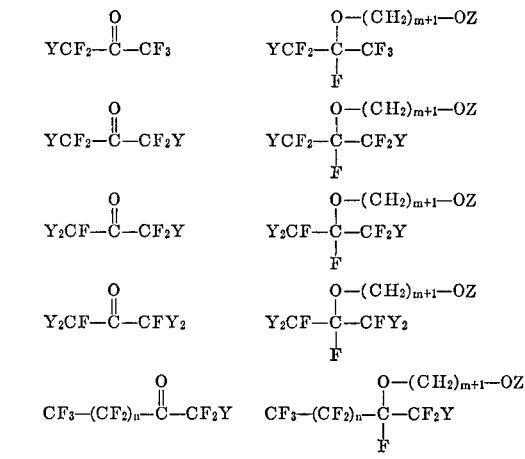

Wherein $n$ is a number from 0 to 18

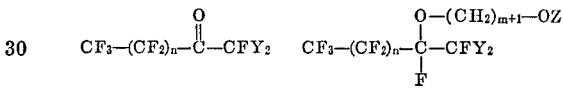

Wherein $n$ is a number from 0 to 18

Compounds containing hydrogen in addition to fluorine ($n$ and $n'$ are each a number from 1 to 18)

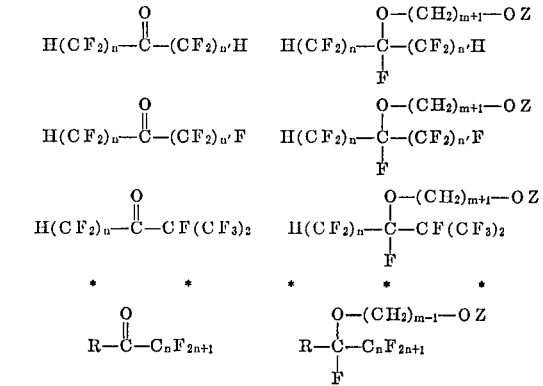

Wherein R represents an alkyl group containing 1 to 18 carbon atoms or a cycloalkyl group such as cyclopropyl, cyclobutyl, or cyclohexyl.

Generally, a preferred class of ketones which may be used in the synthesis of the invention and the products derived therefrom are represented by the following structures:

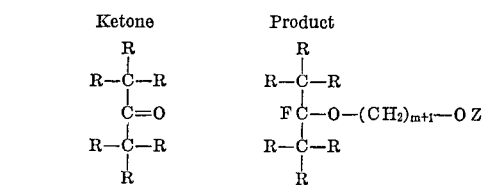

Wherein each R represents a member of the group consisting of hydrogen, halogen, alkyl, haloalkyl, cycloalkyl, and halocycloalkyl and wherein at least two of the R's are fluorine.

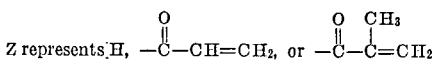

and $m$ is an integer from 1 to 20.

Particularly preferred are the products derived from fluorinated acetones, i.e., $CF_3-CO-CF_3$, $$CF_2Cl-CO-CF_3$$

and $CF_2Cl-CO-CF_2Cl$. These products have the structure—

$$F\underset{CF_3}{\overset{CF_3}{C}}-O(CH_2)_{m+1}-OZ$$

$$F\underset{CF_3}{\overset{CF_2Cl}{C}}-O(CH_2)_{m+1}-OZ$$

$$F\underset{CF_2Cl}{\overset{CF_2Cl}{C}}-O(CH_2)_{m+1}-OZ$$

(Z is as defined above)

As noted above, in a preliminary step of the synthesis the fluoroketone is reacted with an alkali metal fluoride. As the latter reagent, potassium fluoride is generally preferred, but the fluorides of sodium, cesium, and rubidium may also be used. The reaction is generally conducted in an inert solvent for the ketone, for example, acetonitrile, dioxane, tetrahydrofuran, tetramethylene sulphone, diglyme (an abbreviated name for dimethyl ether of diethylene glycol), etc. The alkali metal fluoride is only slightly soluble in these solvents and the disappearance of undispersed alnali metal fluoride during the reaction suprocarbinolate intermediate (which is soluble). The temperature of reaction is not critical. Usually, for convenience, the reaction is conducted at room temperature but it does take place at lower or higher temperatures. Generally, temperatures over 85° C. are avoided to minimize decomposition of the intermediate. Where the starting ketone is a gas (for example, hexafluoroacetone) it is preferred to cool the system first to get the ketone into solution. Then, the temperature can be increased— for example, allowed to warm to room temperature—to accelerate the reaction. To prevent hydrolysis of the intermediate, the reaction is conducted under anhydrous conditions. It is also helpful to remove air (which may contain moisture) by flushing the reaction vessel with dry, inert gas such as nitrogen. When the intermediate is formed—as evidenced by disappearance of undissolved alkali metal fluoride—the system is ready for further treatment. The intermediate is not isolated but is employed just as it is formed. Generically, in accordance with the invention this fluorocarbinolate intermediate has the structure $$R_f-CM$$

wherein $R_f$ and M are as above defined.

Having thus prepared the fluorocarbinolate intermediate, a selected omega halo-aliphatic acid ester is added and the mixture stirred. The temperature is not critical and may range, for example, from room temperature to 100° C. As the omega halo-aliphatic carboxylic acid ester, one may use any of the compounds of the structure $$X-(CH_2)_m-COOR'$$

wherein:
X is Cl, Br, I, or F
m is an integer from 1 to 20
R' is a monovalent hydrocarbyl group such as alkyl, cycloalkyl, alkenyl, alkaryl, or aryl.

Since the only purpose of R' is to provide a blocking group, it is convenient to select a simple group such as methyl or ethyl. Also, maximum yields are obtained where X is bromine or iodine. Accordingly, representative examples of omega halo-aliphatic esters which are especially useful are the methyl or ethyl esters of such acids as bromo or iodo acetic acid, 3-bromopropionic acid, 4-bromobutyric acid, 5-bromovaleric acid, 6-bromocaproic acid, 8-bromocaprylic acid, 10-bromocapric acid, 11-bromoundecanoic acid, 12-bromolauric acid, 16-bromopalmitic acid, 18-bromostearic acid, and the like.

Having thus prepared the ester, $$R_f-O-(CH_2)_m-COOR'$$

this compound is then reduced to the alcohol $$R_f-O-(CH_2)_{m+1}-OH$$

by the action of sodium; a metal hydride such as $LiAlH_4$; or by application of hydrogen at superatmospheric pressure in the presence of a catalyst such as copper chromite.

The alcohol, so produced, is then esterified with an acrylic halide of the structure $$X-\overset{O}{\overset{\|}{C}}-\overset{R''}{\overset{|}{C}}=CH_2$$

wherein X is a halogen such as F, Cl, Br, or I and R'' is H or $CH_3$.

The esterification simply involves contacting the alcohol with the selected halide—usually acryloyl bromide or chloride or methacryloyl bromide or chloride. The temperature of reaction is not critical and may vary from about 20 to 100° C. The byproduct hydrogen halide may be removed from the field of reaction by flushing with an inert gas such as $N_2$ during the reaction, or by adding a hydrogen halide acceptor such as pyridine, dimethylaniline, or other tertiary amine. This step produces the monomeric product, having the structure $$R_f-O-(CH_2)_{m+1}-O-\overset{O}{\overset{\|}{C}}-\overset{R''}{\overset{|}{C}}=CH_2$$

wherein $R_f$, m, and R'' are as above defined.

A particular phase of the invention is concerned with the treatment of fibrous materials, such as textiles, in order to improve their properties, e.g., to improve their oil-, water-, and soil-repellency. In practicing this phase of the invention, a polymerizable ester derived from acrylic (or methacrylic) acid is prepared as above described and applied to the fibrous material, using either of two procedures. In one procedure the monomeric ester is applied to the fibrous material and polymerized in situ thereon by applying ionizing radiation, a persulphate, a peroxide, an azo polymerization initiator, or a redox catalyst system (typically, a combination of a reducing agent such as hydrazine sulfate, ferrous sulphate, sodium bisulphite, etc., and an oxidizing agent such as hydrogen peroxide, benzoyl peroxide, sodium peracetate, etc.). In the preferred procedure, the polymerizable ester is first formed into a polymer and then applied to the fibrous material. The polymer may be a homopolymer, that is, one consisting of recurring units of the ester, or it may be a copolymer, that is, a polymer containing recurring units of the ester interspersed with units derived from a different vinyl monomer, such as ethylene, propylene, styrene, vinyl chloride, acrylonitrile, methyl methacrylate or acrylate, acrylamide, methacrylamide, vinyl acetate or stearate, butadiene, and the like. The polymers are prepared by conventional techniques. For example, the polymerizable ester per se or admixed with a different vinyl monomer is heated at about 70– 85° C. in the presence of a small proportion of a polymerization initiator such as $\alpha,\alpha,'$-azobisisobutyronitrile. As illustrative examples of this procedure, when w-(heptafluoroisopropoxy)pentyl acrylate is formed into a homopolymer, the product will be a polymer containing in its skeletal chain recurring units of the structure $$-CH_2CH-$$
$$\overset{|}{C}=O$$
$$\overset{|}{O}$$
$$\overset{|}{(CH_2)_5}$$
$$\overset{|}{O}$$
$$CF_3-\overset{|}{C}F-CF$$

In the event that the same ester is copolymerized with ethyl acrylate, for example, the copolymer product will contain in its skeletal chain recurring units of the above type plus recurring units derived from ethyl acrylate, i.e.,

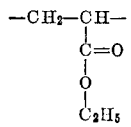

In any event, the polymers (homo- or co-polymers) are applied to the fibrous material in conventional manner. Typically, the polymer is disolved in an inert, volatile solvent—for example, benzotrifluoride or 1,3-bis-trifluorobenzene—and the resulting solution applied to the fibrous material by a conventional dip and pad technique. By varying the concentration of polymer in solution and the degree of padding, the amount of polymer deposited on the material may be varied. The polymer may also be made into an aqueous emulsion and applied by a dip and pad procedure. Typically, the amount of polymer may be about from 0.1 to 20%, based on the weight of fibrous material but it is obvious that higher or lower proportions can be used if desired. Usually, in treating textiles such as fabrics the amount of polymer is limited to about 0.1 to 10% to attain the desired repellency improvement without interference with the hand of the textile. Generally, it is preferred to subject the fibrous material to a conventional curing operation after application of the polymer solution thereto in order to bond the polymer to the fibers. As an example of such treatment, the fibrous material is heated in the range of about 50 to 150° C. for a period of about 5 to 30 minutes. The solvent (from the polymer solution or emulsion) may be evaporated in a separate step prior to curing or may be simply evaporated during the curing operation. Fibrous materials treated with the polymers of the invention display an increased resistance to becoming soiled because they repel both water- and oil-borne soils and stains. Moreover, the improvements so rendered are durable—they are retained despite laundering and drycleaning of the product.

The invention may be utilized for improving the properties of all types of fibrous materials, for example, paper; cotton; linen; hemp; jute; ramie; sisal; cellulose acetate rayons cellulose acetate-butyrate rayons; saponified acetate rayons; viscose rayons; cuprammonium rayons; ethyl cellulose; fibers prepared from amylose, algins, or pectins; wool; silk; animal hair; mohair; leather; fur; regenerated protein fibers prepared from casein, soybean, peanut proteins, zein, gluten, egg albumin, collagen, or keratins nylon; polyurethane fibers; polyester fibers such as polyethylene terephthalate; polyacrylonitrile-based fibers; or fibers of inorganic origin such as asbestos, glass, etc. The invention may be applied to textile materials which are in the form of bulk fibers, filaments, yarns, threads, slivers, roving, top, webbing, cord, tape, woven or knitted fabrics, felts or other nonwoven fabrics, garments or garment parts.

EXAMPLES

The invention is further demonstrated by the following illustrative examples. The various tests described in the examples were carried out as described below:

*Oil repellency.*—The 3M repellency test described by Crajack and Peterson, Textile Research Journal, 32, pages 320–321, 1962, Ratings are from 0 to 150, with the higher values signifying the greater resistance to oil penetration.

*Water repellency.*—AATC spray test, method 22–1952. Ratings are from 0 to 100, with the higher values signifying greater resistance to water penetration.

EXAMPLE I 5-(heptafluoroisopropoxy)pentanol (A) Anhydrous potassium fluoride (18.2 g.) and 200 ml. of diglyme were introduced into a three-neck flask equipped with gas inlet tube, magnetic stirring bar, and Dry-Ice reflux condenser. The contents of the flask were cooled in Dry-Ice-acetone and 51.2 g. of hexafluoroacetone was introduced through the gas inlet tube. The flask was allowed to warm to room temperature while the contents were stirred. After approximately 3 hrs., the potassium alcoholate

has formed as evidenced by disappearance of KF from the suspension, leaving a clear solution. The Dry-Ice condenser was replaced with a water-cooled condenser and 60 g. of methyl 5-bromovalerate was added to the flask. The reaction mixture was stirred and heated to 80–85° C. over a period of 72 hours, during which time KBr precipitated out of solution. The reaction mixture was poured into ice water and the lower, fluorocarbon, layer was collected, washed twice with 50-ml. portions of water and dried. The product, methyl 5-(heptafluoroisopropoxy)valerate

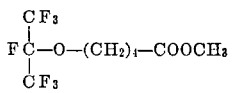

was recovered by distillation under vacuum. It was a clear liquid, B.P. 167° C. at 760 mm.

(B) A 50-ml., three-neck flask was dried, flushed with dry nitrogen and charged with 1.14 g. LiAlH$_4$ (0.03 mole) and 20 ml. ether. Nine grams (0.03 mole) of methyl 5-(heptafluoroisopropoxy) valerate was dissolved in 15 ml. of ether and added dropwise to the LiAlH$_4$ mixture with stirring over a half-hour period. The mixture was refluxed and additional half-hour, then 0.8 cc. ethyl acetate was added to consume unreacted hydride. The mixture was then poured over about 100 cc. cold, diluted, aqueous sulfuric acid. The ether layer was retained. The water phase was washed twice with ether and the various ether layers combined and dried over CaSo$_4$. After removal of the ether, 7.0 g. of liquid remained which was distilled at 75° C./9 mm.; $N_D^{22}$ 1.3512. The structure of the product is:

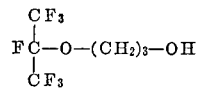

*Analysis.*—Cal'd for (percent): C$_8$H$_{11}$O$_2$F$_7$: F, 48.9. Found (percent): F, 48.5.

EXAMPLE II 5-(heptafluoroisopropoxy)pentyl acrylate

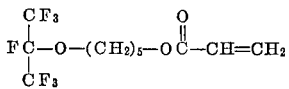

Acryloxyl chloride (3.2 g). was placed in a dry, 3-neck, 25-ml. flask and heated to 50° C. Then 3.3 g. of 5-(heptafluoroisopropoxy)pentanol was added slowly with a syringe. Nitrogen was bubbled through the system during the reaction to facilitate removal of HCl. The mixture was stirred and heated at 65° C. for 1 hour and then distilled in vacuo. After excess acryloyl chloride was removed, a 2.4-g. sample of clear acrylate was obtained, B.P. 65° C./0.1–0.2 mm.

EXAMPLE III

Application of poly-(heptafluoroisopropoxypentyl) acrylate in wool fabric

A sample of the monomeric acrylate prepared as described in Example II was heated at 80° C. with 0.5% α,α'-azobisisobutyronitrile for 3 hours. The rubbery, solid polymer was dissolved in benzotrifluoride as a 5% solution. A wool swatch was wet-out with the solution and then dried and cured at 105° C. for 20 minutes. The oil-repellency rating of the fabric was 60 and the water-repellency rating was 100. The oil-repellency rating of the untreated fabric was 0 and the water-repellency rating was 50.

EXAMPLE IV 11-(heptafluoroisopropoxy)undecyl acrylate

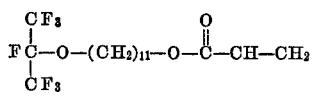

(A) The procedure described in Example I, part A, was applied to the following materials:

Potassium fluoride—25 g.
Diglyme—250 cc.
Hexafluoroacetone—72 g.
Ethyl 11-bromoundecanoate—112 g.

to produce a 70% yield of ethyl 11-(heptafluoroisopropoxy)undecanoate

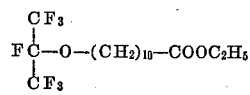

(B) Using the procedure described in Example I, part 3, and Example II, the above ester was reduced to 11-(heptafluoroisopropoxy)undecanol, which was then reacted with acryloyl chloride to obtain the acrylic ester. Because of the low volatility and ease of polymerization of the monomer, purification by distillation was difficult. The acrylate polymerized to a tacky solid when heated with a catalytic quantity (0.2%) of α,α-azobisisobutyronitrile. A 5% solution of the polymer was prepared in benzotrifluoride. A wool swatch was wet-out with this solution and dried and cured at 105° C. for 20 minutes. The oil-repellency rating of the fabric was 50 and the water-repellency rating was 100. (The untreated fabric had an oil-repellency of 0 and a water-repellency of 50.)

Having thus described the invention, what is claimed is:

1. An addition polymer having a skeletal chain containing recurring units of the structure

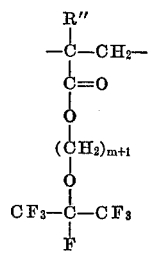

wherein $m$ is an integer from 1 to 20 and $R''$ is a member of the class consisting of H and $CH_3$.

2. An addition polymer having a skeletal chain containing recurring units of the structure

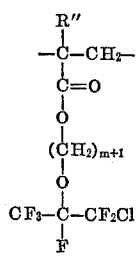

wherein $m$ is an integer from 1 to 20 and $R''$ is a member of the class consisting of H and $CH_3$.

3. An addition polymer having a skeletal chain containing recurring units of the structure

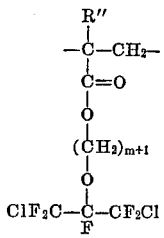

wherein $m$ is an integer from 1 to 20 and $R''$ is a member of the class consisting of H and $CH_3$.

4. The process which comprises impregnating fibrous material with an addition polymer having a skeletal chain containing recurring units of the structure

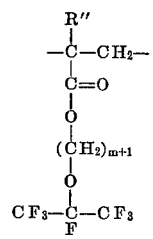

wherein $m$ is an integer from 1 to 20 and $R''$ is a member of the class consisting of H and $CH_3$.

5. The process which comprises impregnating fibrous material with an addition polymer having a skeletal chain containing recurring units of the structure

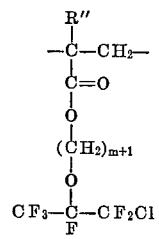

wherein $m$ is an integer from 1 to 20 and $R''$ is a member of the class consisting of H and $CH_3$.

6. The process which comprises impregnating fibrous material with an addition polymer having a skeletal chain containing recurring units of the structure

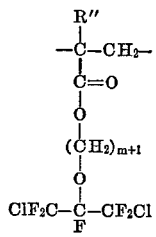

wherein $m$ is an integer from 1 to 20 and $R''$ is a member of the class consisting of H and $CH_3$.

7. Fibrous material impregnated with an addition polymer having a skeletal chain containing recurring units of the structure

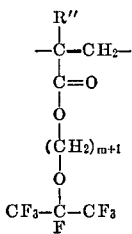

wherein $m$ is an integer from 1 to 20 and $R''$ is a member of the class consisting of H and $CH_3$.

8. Fibrous material impregnated with an addition polymer having a skeletal chain containing recurring units of the structure

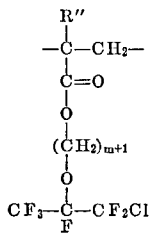

wherein $m$ is an integer from 1 to 20 and $R''$ is a member of the class consisting of H and $CH_3$.

9. Fibrous material impregnated with an addition polymer having a skeletal chain containing recurring units of the structure

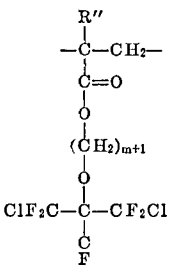

wherein $m$ is an integer from 1 to 20 and $R''$ is a member of the class consisting of H and $CH_3$.

References Cited

UNITED STATES PATENTS

| | | | |
|---|---|---|---|
| 2,826,564 | 3/1958 | Bovey et al. | 260—89.5 |
| 3,177,185 | 4/1965 | Hollander et al. | 260—89.5 |
| 3,394,115 | 7/1968 | Sorkin. | |
| 3,424,785 | 1/1969 | Pittman et al. | 260—89.5 |

HARRY WONG, JR., Primary Examiner

U.S. Cl. X.R.

117—122, 124, 126, 138.8, 140, 142, 143, 155; 260—33.8, 83.5, 86.1, 86.3, 86.7, 486, 614, 615